United States Patent
Nagai et al.

(10) Patent No.: US 9,890,754 B2
(45) Date of Patent: Feb. 13, 2018

(54) CONTROL APPARATUS FOR A VEHICLE

(71) Applicant: TOYOTA JIDOSHA KABUSHIKI KAISHA, Toyota-shi, Aichi-ken (JP)

(72) Inventors: Masakatsu Nagai, Hiratsuka (JP);
Shigeyuki Urano, Gotenba (JP);
Keisuke Sasaki, Susono (JP); Rui Onoda, Gamagoori (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 56 days.

(21) Appl. No.: 14/915,444

(22) PCT Filed: Jul. 23, 2014

(86) PCT No.: PCT/JP2014/069453
§ 371 (c)(1),
(2) Date: Feb. 29, 2016

(87) PCT Pub. No.: WO2015/029650
PCT Pub. Date: Mar. 5, 2015

(65) Prior Publication Data
US 2016/0208761 A1   Jul. 21, 2016

(30) Foreign Application Priority Data

Sep. 2, 2013 (JP) ................................ 2013-181345

(51) Int. Cl.
*F02B 3/00* (2006.01)
*F02N 11/04* (2006.01)
(Continued)

(52) U.S. Cl.
CPC .............. *F02N 11/04* (2013.01); *B60K 6/387* (2013.01); *B60K 6/48* (2013.01); *B60K 6/54* (2013.01);
(Continued)

(58) Field of Classification Search
CPC .......... F02N 11/04; F02N 11/00; F02N 11/08; F02N 11/0818; F02N 99/006;
(Continued)

(56) References Cited

U.S. PATENT DOCUMENTS

| | | | | | |
|---|---|---|---|---|---|
| 5,056,487 A | * | 10/1991 | Yamakado | ............ | G01M 15/08 123/192.2 |
| 6,018,198 A | * | 1/2000 | Tsuzuki | ................. | B60K 6/365 180/65.25 |

(Continued)

FOREIGN PATENT DOCUMENTS

| DE | 102006045661 A1 | 4/2008 |
|---|---|---|
| DE | 102008002666 A1 | 12/2009 |

(Continued)

*Primary Examiner* — Hung Q Nguyen
*Assistant Examiner* — Anthony Taylor, Jr.
(74) *Attorney, Agent, or Firm* — Hauptman Ham, LLP

(57) ABSTRACT

An internal combustion engine is provided that executes fuel injection and ignition with respect to a cylinder that remains stopped in an expansion stroke, and that performs ignition startup that starts up the internal combustion engine by rotationally driving a crankshaft by pressure of combustion accompanying the fuel injection. A motor generator (MG) that can rotationally drive the crankshaft is provided. A required assist torque Ast_trq exerted by the MG at the time of ignition startup is determined based on a maximum value Cyl_prss of an in-cylinder pressure that is detected by an in-cylinder pressure sensor at the time of ignition startup. The MG is controlled at the time of ignition startup based on the required assist torque Ast_trq that is determined.

7 Claims, 5 Drawing Sheets

(51) Int. Cl.

| | | |
|---|---|---|
| *B60K 6/387* | (2007.10) | |
| *B60K 6/48* | (2007.10) | |
| *B60W 10/06* | (2006.01) | |
| *B60W 10/08* | (2006.01) | |
| *B60W 20/00* | (2016.01) | |
| *F02N 11/08* | (2006.01) | |
| *F02N 99/00* | (2010.01) | |
| *F02D 29/02* | (2006.01) | |
| *B60K 6/547* | (2007.10) | |
| *B60W 20/40* | (2016.01) | |
| *F02D 35/02* | (2006.01) | |
| *B60K 6/54* | (2007.10) | |
| *F02D 45/00* | (2006.01) | |
| *F02N 11/00* | (2006.01) | |
| *F02N 15/02* | (2006.01) | |
| *F02P 5/15* | (2006.01) | |

(52) U.S. Cl.
CPC ............ *B60K 6/547* (2013.01); *B60W 10/06* (2013.01); *B60W 10/08* (2013.01); *B60W 20/00* (2013.01); *B60W 20/40* (2013.01); *F02D 29/02* (2013.01); *F02D 35/023* (2013.01); *F02D 45/00* (2013.01); *F02N 11/00* (2013.01); *F02N 11/08* (2013.01); *F02N 11/0818* (2013.01); *F02N 99/006* (2013.01); *F02P 5/15* (2013.01); *B60W 2510/0685* (2013.01); *B60Y 2300/48* (2013.01); *F02N 15/022* (2013.01); *F02N 2200/023* (2013.01); *F02N 2300/104* (2013.01); *F02P 5/1506* (2013.01); *Y02T 10/48* (2013.01); *Y02T 10/6221* (2013.01); *Y02T 10/6286* (2013.01)

(58) Field of Classification Search
CPC ............ F02N 15/022; F02N 2200/023; F02N 2300/104; B60K 6/387; B60K 6/48; B60K 6/54; B60K 6/547; B60W 10/06; B60W 10/08; B60W 20/00; B60W 20/40; B60W 2510/0685; F02D 29/02; F02D 35/023; F02D 45/00; F02P 5/15; F02P 5/1506; B60Y 2300/48; Y02T 10/48; Y02T 10/6221; Y02T 10/6286
USPC ......................................................... 123/294
See application file for complete search history.

(56) References Cited

U.S. PATENT DOCUMENTS

| | | | |
|---|---|---|---|
| 6,077,186 A * | 6/2000 | Kojima | B60K 6/48 180/65.25 |
| 7,996,145 B2 * | 8/2011 | Snyder | B60W 20/15 123/179.5 |
| 9,303,551 B2 * | 4/2016 | Kojima | B60K 6/48 |
| 2005/0139183 A1 | 6/2005 | Nohara et al. | |
| 2008/0077308 A1 | 3/2008 | Laubender | |
| 2012/0122630 A1 | 5/2012 | Huber et al. | |

FOREIGN PATENT DOCUMENTS

| | | | | |
|---|---|---|---|---|
| JP | H06-101564 A | | 4/1994 | |
| JP | 2000-225871 A | | 8/2000 | |
| JP | 2005-110461 A | | 4/2005 | |
| JP | 2005110461 | * | 4/2005 | ............ B60W 20/00 |
| JP | 2005188283 A | | 7/2005 | |
| JP | 2007051599 A | | 3/2007 | |
| JP | 2011-201413 A | | 10/2011 | |
| JP | 2013-095155 A | | 5/2013 | |
| JP | 2013-119273 A | | 6/2013 | |

* cited by examiner

[Fig. 1]
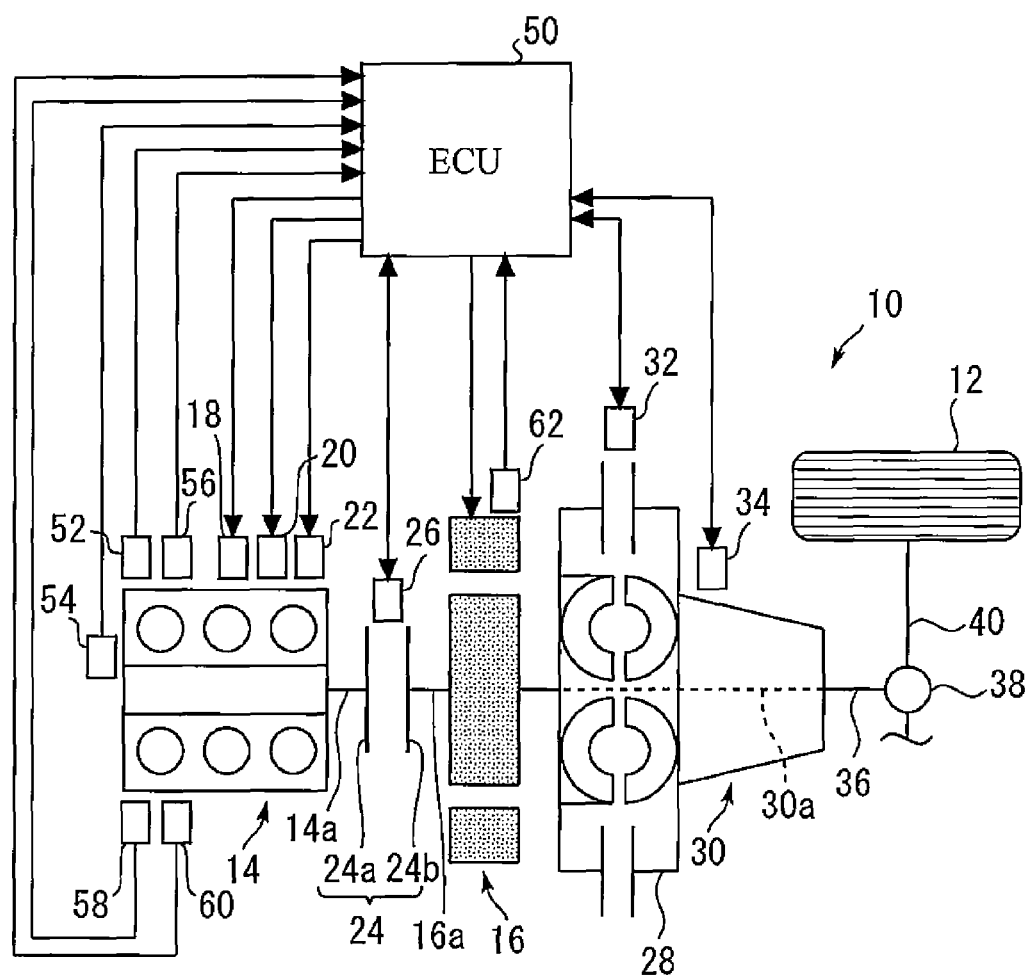

[Fig. 2]
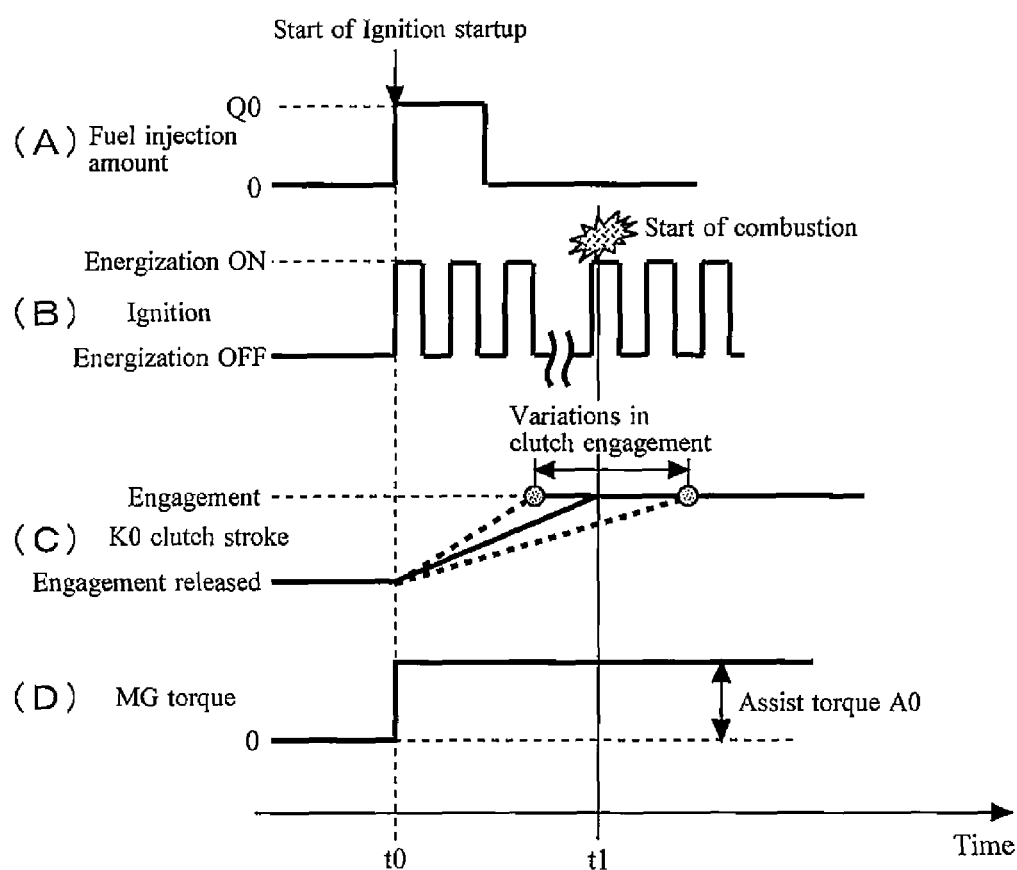

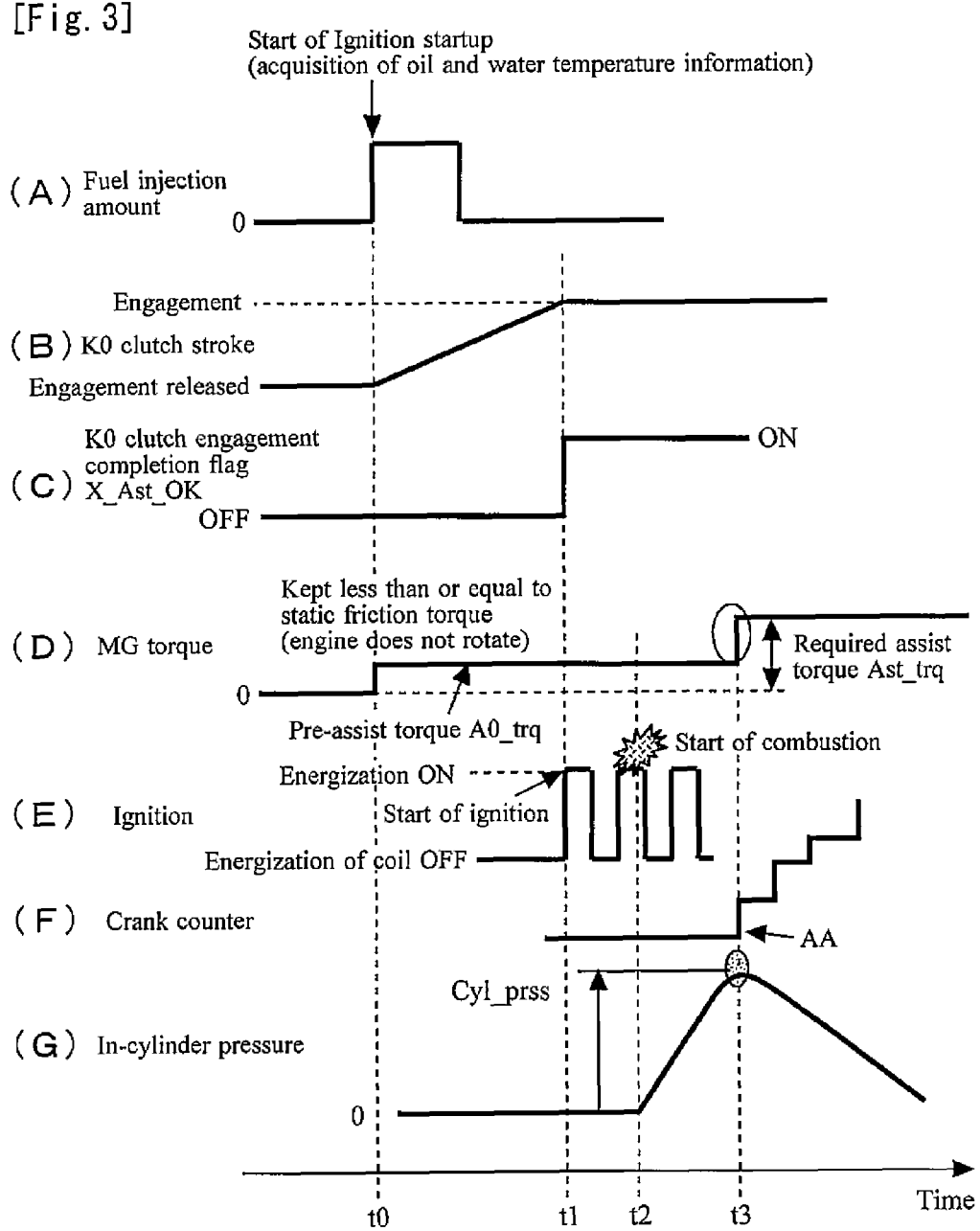
[Fig. 3]
AA: Position at which piston starts to move (torque at time of startup > friction torque)

[Fig. 4]
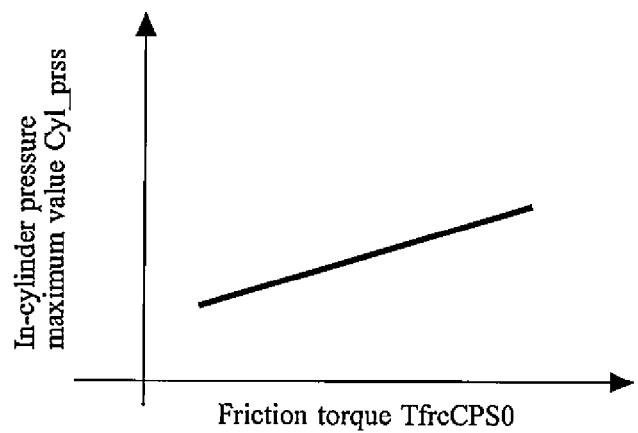
[Fig. 5]
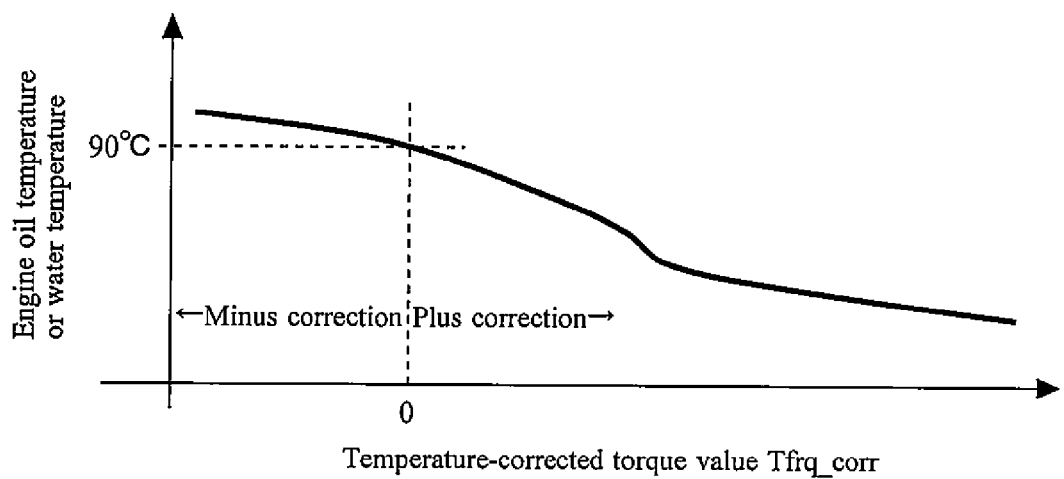

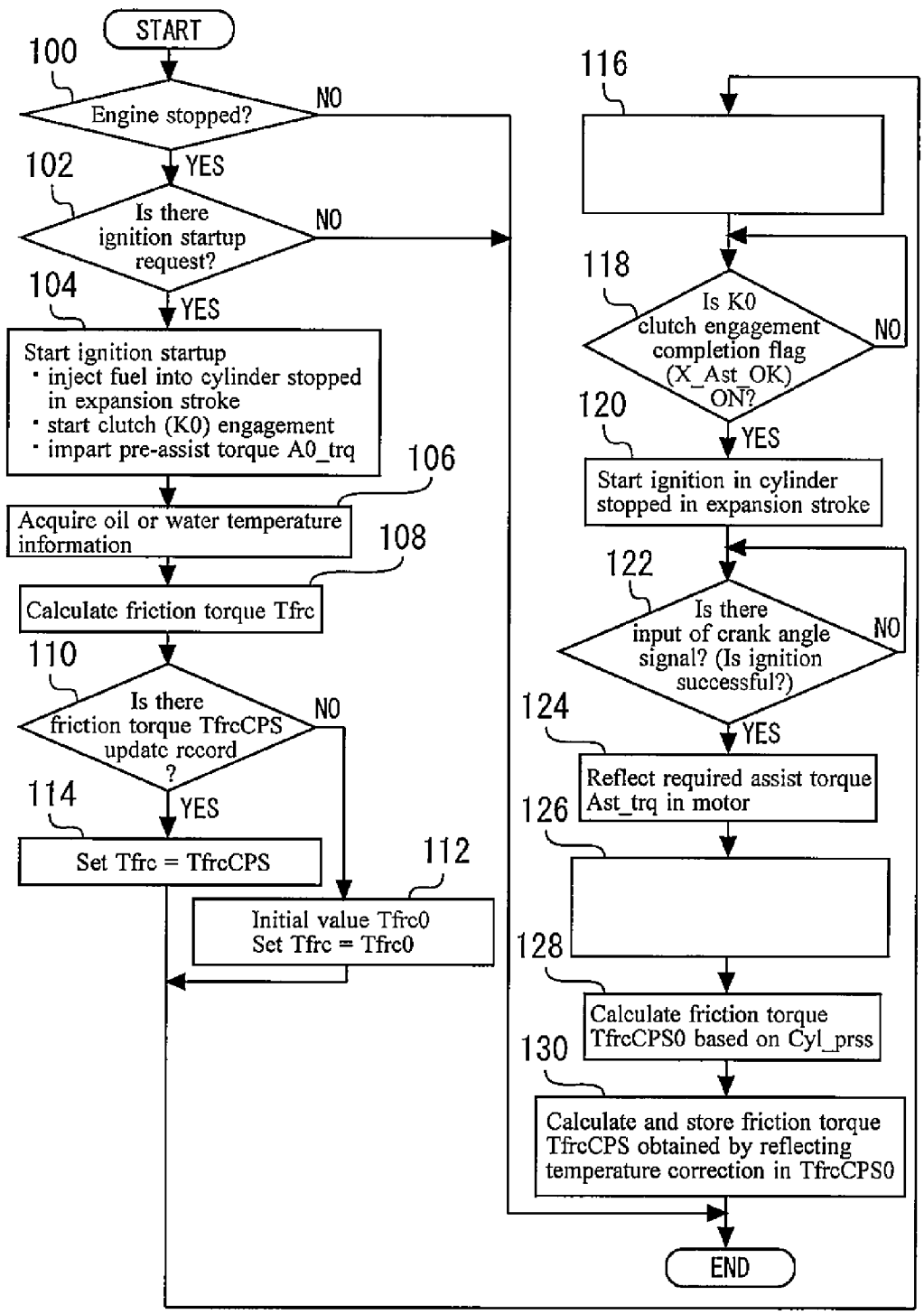
[Fig. 6]
116: Determine required assist torque Ast_trq
    Ast_trq = Tfrc + temperature-corrected torque value Tfrc_corr (Map)
126: • Acquire in-cylinder pressure maximum value (Cyl_prss) at time of crank signal input
    • Acquire oil or water temperature information

US 9,890,754 B2

CONTROL APPARATUS FOR A VEHICLE

CROSS-REFERENCE TO RELATED APPLICATIONS

This is a national phase application based on the PCT International Patent Application No. PCT/JP2014/069453 filed Jul. 23, 2014, claiming priority to Japanese Patent Application No. 2013-181345 filed Sep. 2, 2013, the entire contents of both of which are incorporated herein by reference.

TECHNICAL FIELD

The present invention relates to a control apparatus for a vehicle, and more particularly to a control apparatus for a vehicle that is suitable as an apparatus for controlling a vehicle that is equipped with an internal combustion engine in which various kinds of engine control are performed utilizing detected values of an in-cylinder pressure sensor.

BACKGROUND

A drive control apparatus for a hybrid vehicle that is equipped with an internal combustion engine and an electric motor as power sources and that performs combustion startup (ignition startup) that utilizes expansion stroke injection has already been disclosed in, for example, Patent Literature 1. According to the aforementioned drive control apparatus, a configuration is adopted that causes the ignition and combustion in the internal combustion engine to be started in synchrony with a timing at which torque (assist torque) from a drive wheels side is imparted to the internal combustion engine at a time of ignition startup. Further, to avoid the occurrence of torque shock that is caused by torque being taken to the internal combustion engine side from the drive wheels side when starting the internal combustion engine, the torque of the electric motor is increased.

CITATION LIST

Patent Literature

Patent Literature 1: Japanese Patent Laid-Open No. 2011-201413
Patent Literature 2: Japanese Patent Laid-Open No. 2005-110461
Patent Literature 3: Japanese Patent Laid-Open No. 2013-119273

SUMMARY OF INVENTION

Technical Problem

If the assist torque that the electric motor imparts to the crankshaft when realizing ignition startup is not appropriate, there is the possibility that it will not be possible to reliably perform ignition startup. An appropriate value of the relevant assist torque can vary due to the friction at sliding portions of the internal combustion engine being affected by machine differences of the internal combustion engine, variations in environmental conditions (cooling water temperature, lubricating oil temperature of the internal combustion engine or the like), and a temporal change in the internal combustion engine and the like. If a large assist torque that includes a certain margin is imparted so as to eliminate the influence of such factors so that the ignition startup can be reliably realized, the electric power consumption of the electric motor will increase, and consequently it will be difficult to improve the fuel efficiency of the internal combustion engine by extending a vehicle running range in which the driving force of the electric motor is utilized. Accordingly, in order to achieve an improvement in fuel efficiency, it is desirable that the assist torque is reduced as much as possible while contributing to realization of stable ignition startup.

The present invention has been made in view of the above described problem, and a first object of the present invention is to provide a control apparatus for a vehicle that, while dealing with the influence of a temporal change in an internal combustion engine and the like, can appropriately suppress assist torque for rotation of a crankshaft generated by an electric motor and realize stable ignition startup.

Further, in a case where, in a vehicle equipped with an internal combustion engine that performs ignition startup and an electric motor that is capable of rotationally driving a crankshaft of the internal combustion engine, a clutch is provided that switches between a state of engaging the crankshaft and a rotary shaft of the electric motor, and a state of releasing the engagement therebetween, when assisting rotation of the crankshaft by means of the electric motor at a time of ignition startup, in some cases variations in the operation of the clutch may affect realization of the ignition startup.

The present invention has been made to solve the above described problem, and a second object of the present invention is to provide a control apparatus for a vehicle that can eliminate the influence of variations in the operation of a clutch that switches between a state of engaging a crankshaft of an internal combustion engine and a rotary shaft of an electric motor, and a state of releasing the engagement therebetween to thereby realize stable ignition startup.

Solution to Problem

A first aspect of the present invention is a control apparatus for a vehicle including an internal combustion engine which includes a fuel injection valve for directly injecting fuel into a cylinder, a spark plug for igniting an air-fuel mixture, a crank angle sensor for detecting a crank angle, and an in-cylinder pressure sensor for detecting an in-cylinder pressure, and which performs ignition startup that executes fuel injection and ignition with respect to a cylinder that remains stopped in an expansion stroke and rotationally drives a crankshaft by means of a pressure of combustion that accompanies the fuel injection to thereby start up the internal combustion engine, the control apparatus comprising:

an electric motor that is configured to rotationally drive the crankshaft;

assist torque determination means for determining an assist torque that the electric motor exerts to assist rotation of the crankshaft at a time of ignition startup, based on a local maximum value of an in-cylinder pressure detected by the in-cylinder pressure sensor at the time of ignition startup; and control means for controlling the electric motor at the time of ignition startup based on the assist torque that is determined.

A second aspect of the present invention is the control apparatus for a vehicle according to the first aspect of the present invention, wherein the assist torque determination means determines an assist torque that is used at the time of ignition startup based on a maximum value of an in-cylinder pressure detected by the in-cylinder pressure sensor in a cylinder in which combustion is performed first at the time of ignition startup.

A third aspect of the present invention is the control apparatus for a vehicle according to the first or second aspect of the present invention, wherein, prior to causing the electric motor to exert the assist torque that is determined by the assist torque determination means, the control means controls the electric motor so as to exert a pre-assist torque that is lower than the assist torque.

A fourth aspect of the present invention is the control apparatus for a vehicle according to any one of the first to third aspects of the present invention, wherein, when the crankshaft starts to move during the ignition startup, the control means controls the electric motor so as to exert the assist torque that is determined by the assist torque determination means.

A fifth aspect of the present invention is the control apparatus for a vehicle according to any one of the first to fourth aspects of the present invention, wherein the electric motor is provided as a second power source of the vehicle, and wherein the control apparatus further comprises:

a clutch that switches between a state of engaging the crankshaft and a rotary shaft of the electric motor and a state in which the engagement is released; and ignition timing control means for controlling an ignition timing so that ignition by the spark plug is started at or after a time point at which engagement of the crankshaft and the rotary shaft of the electric motor by the clutch is completed during the ignition startup.

A sixth aspect of the present invention is a control apparatus for a vehicle including an internal combustion engine which includes a fuel injection valve for directly injecting fuel into a cylinder, a spark plug for igniting an air-fuel mixture, and a crank angle sensor for detecting a crank angle, and which performs ignition startup that executes fuel injection and ignition with respect to a cylinder that remains stopped in an expansion stroke and rotationally drives a crankshaft by means of a pressure of combustion that accompanies the fuel injection to thereby start up the internal combustion engine, the control apparatus comprising:

an electric motor that is provided as a second power source of the vehicle and that is configured to rotationally drive the crankshaft;

a clutch that switches between a state of engaging the crankshaft and a rotary shaft of the electric motor and a state in which the engagement is released; and ignition timing control means for controlling an ignition timing so that ignition by the spark plug is started at or after a time point at which engagement of the crankshaft and the rotary shaft of the electric motor by the clutch is completed during the ignition startup.

Advantageous Effects of Invention

The influence of changes in the friction of sliding portions of an internal combustion engine is manifested as fluctuations in a local maximum value of an in-cylinder pressure during ignition startup. According to the first aspect of the present invention, an assist torque can be obtained that is in accordance with fluctuations in a local maximum value of the in-cylinder pressure that is detected by an in-cylinder pressure sensor during ignition startup. As a result, stable ignition startup can always be realized utilizing an assist torque that is appropriately suppressed while also dealing with the influence of a temporal change in the friction of the internal combustion engine and the like.

According to the second aspect of the present invention, by adopting a configuration in which a maximum value of the in-cylinder pressure in a cylinder in which combustion is initially performed at the time of ignition startup (that is, an in-cylinder pressure value at a time that the crankshaft starts to move) is used to determine the assist torque, the assist torque can be determined more accurately.

According to the third aspect of the present invention, the influence, on the ignition startup, of fluctuations in the timing for starting assist by the electric motor can be reduced while avoiding a situation in which the crankshaft starts to move before imparting of the aforementioned assist torque starts.

According to the fourth aspect of the present invention, assist of ignition startup by the electric motor can be efficiently performed.

According to the fifth aspect of the present invention, the influence of clutch operation variations can be eliminated and stable ignition startup can be realized.

According to the sixth aspect of the present invention, the influence of clutch operation variations can be eliminated and stable ignition startup can be realized.

BRIEF DESCRIPTION OF DRAWINGS

FIG. 1 is a view that illustrates the configuration of a hybrid vehicle to which a control apparatus according to Embodiment 1 of the present invention is applied;

FIG. 2 is a time chart for describing a problem that arises at a time of ignition startup that is accompanied by motor assist;

FIG. 3 is a time chart for describing characteristic control according to Embodiment 1 of the present invention;

FIG. 4 is a view that represents the relation between the maximum value Cyl_prss of a in-cylinder pressure in a starting cylinder during ignition startup and a friction torque TfrcCPS0 of an internal combustion engine;

FIG. 5 is a view that illustrates an example of setting a temperature-corrected torque value Tfrc_corr that is used for calculating a required assist torque Ast_trq; and FIG. 6 is a flowchart of a routine that is executed in Embodiment 1 of the present invention.

DESCRIPTION OF EMBODIMENTS

Embodiment 1

[System Configuration of Embodiment 1]

FIG. 1 is a view that illustrates the configuration of a hybrid vehicle 10 to which a control apparatus according to Embodiment 1 of the present invention is applied. The hybrid vehicle 10 illustrated in FIG. 1 includes an internal combustion engine 14 and a motor generator (hereunder, referred to simply as "MG") 16 as power sources for driving drive wheels 12.

The internal combustion engine 14 is configured as a spark-ignition internal combustion engine, and includes a throttle valve 18, a fuel injection valve 20 and a spark plug 22 and the like as actuators. The throttle valve 18 is a component for adjusting an intake air flow rate of the internal combustion engine 14. The fuel injection valve 20 is a component for injecting fuel directly into a cylinder of the internal combustion engine 14. The spark plug 22 is a component for igniting an air-fuel mixture in a cylinder.

The MG 16 is a component that has a function as an electric power generator and also a function as an electric motor, and mutually transmits/receives electric power with a battery through an inverter (the battery and inverter are not illustrated in the drawings).

An output shaft (crankshaft) 14a of the internal combustion engine 14 is connected to an output shaft 16a of the MG 16 through a K0 clutch 24. The K0 clutch 24 performs an operation to engage a clutch plate 24a that is provided on the output shaft 14a side of the internal combustion engine 14 and a clutch plate 24b that is provided on the output shaft 16a side of the MG 16, and also to release the engagement therebetween by means of a K0 actuator 26. By this means, a power transmission path is connected or disconnected between the internal combustion engine 14 and the MG 16. As one example, it is assumed that the K0 actuator 26 is a hydraulic actuator (more specifically, an actuator that causes frictional engagement between the clutch plate 24a and the clutch plate 24b by means of a hydraulic cylinder that is not illustrated in the drawings). More specifically, when the K0 clutch 24 is engaged, only the driving force of the internal combustion engine 14 or the resultant force of the driving force of the internal combustion engine 14 and the driving force of the MG 16 can be transmitted to the drive wheels 12. When the K0 clutch 24 is disengaged, it is possible to transmit only the driving force of the MG 16 to the drive wheels 12. Note that, a sensor for detecting the stroke of the K0 clutch 24 is contained in the K0 actuator 26.

The output shaft 16a of the MG 16 is connected to an automatic transmission 30 through a torque converter 28. The torque converter 28 is a fluid clutch that transmits rotation of the internal combustion engine 14 or the MG 16 to an output shaft 30a of the automatic transmission 30 through oil. The torque converter 28 also includes a lock-up clutch for placing the output shaft 16a of the MG 16 and the output shaft 30a of the automatic transmission 30 in a directly coupled state. The lock-up clutch of the torque converter 28 is hydraulically controlled by an actuator 32. The automatic transmission 30 is an apparatus that automatically switches a transmission gear ratio based on information such as the vehicle speed, and is hydraulically controlled by an actuator 34.

A propeller shaft 36 is connected to the output shaft 30a of the automatic transmission 30. The propeller shaft 36 is connected to left and right drive shafts 40 through differential gears 38. The drive shafts 40 are connected to the respective drive wheels 12.

The control apparatus of the hybrid vehicle 10 according to the present embodiment includes an electronic control unit (ECU) 50. The ECU is configured by an arithmetic processing unit that includes a memory circuit including a ROM, a RAM, a non-volatile memory and the like, and input/output ports. Various sensors provided in the hybrid vehicle 10 are connected to an input section of the ECU 50. Specifically, an air flow meter 52 for measuring an intake air flow rate, a crank angle sensor 54 for detecting the crank angle and the engine speed, an in-cylinder pressure sensor 56 for detecting the in-cylinder pressure in each cylinder, a water temperature sensor 58 for detecting the temperature of cooling water of the internal combustion engine 14, and an oil temperature sensor 60 for detecting the temperature of lubricating oil of the internal combustion engine 14 are installed in the internal combustion engine 14. Further, an MG rotational speed sensor 62 for detecting the rotational speed of the MG 16 is installed therein. Various actuators such as the aforementioned throttle valve 18, fuel injection valve 20, spark plug 22, K0 actuator 26 and actuators 32 and 34 are connected to an output section of the ECU 50. The ECU 50 processes the signals of the various sensors that are taken in, and actuates the respective actuators in accordance with predetermined control programs to thereby control driving of the internal combustion engine 14, driving of the MG 16, engagement operations of the K0 clutch 24, operations of the lock-up clutch of the torque converter 28, and the transmission gear ratio and gear changing timing of the automatic transmission 30 and the like that are provided in the hybrid vehicle 10. Note that the actuators and sensors connected to the ECU 50 also include a large number of actuators and sensors that are not illustrated in the drawing, and a description of such actuators and sensors is omitted from the present description.

[Control of Embodiment 1]

(Automatic Engine Stopping Function)

For the purpose of decreasing fuel consumption and reducing exhaust emissions and the like, the hybrid vehicle 10 that has the above described configuration is equipped with an automatic engine stopping function that, in a case where there is no request to generate vehicle driving torque or to charge the battery while the vehicle is running, automatically stops the internal combustion engine 14 while the vehicle is running or while the vehicle is temporarily stopped, and thereafter restarts the internal combustion engine 14 when a request to restart the internal combustion engine 14 is recognized.

(Ignition Startup Accompanied by Motor Assist)

When restarting the internal combustion engine 14 after automatically stopping the internal combustion engine 14 as described above, the hybrid vehicle 10 is configured to use a starting technique (hereunder, referred to as "ignition startup") that performs fuel injection and ignition with respect to a cylinder that remains stopped in an expansion stroke to thereby cause combustion to occur in the cylinder, and thereby starts (restarts) the internal combustion engine 14 by rotationally driving the crankshaft 14a using the pressure of the combustion. By this means, electric power consumption can be suppressed in comparison to a case of restarting the internal combustion engine 14 using the electric motor that functions as a starter motor, and thus a further improvement in the fuel efficiency can be achieved.

In addition, to ensure that ignition startup can be reliably realized, the hybrid vehicle 10 according to the present embodiment is configured to cause the MG 16 to function as an electric motor so as to assist (hereunder referred to as "motor assist") rotation of the crankshaft 14a at a time of ignition startup.

FIG. 2 is a time chart for describing a problem that arises at a time of ignition startup that is accompanied by motor assist. More specifically, FIG. 2 illustrates an example in which, at a starting time point t0 of ignition startup that is a time point at which fuel injection and ignition to a cylinder that remains stopped in an expansion stroke are started, imparting of a motor assist torque (MG torque) by the MG 16 is started together with the start of an engagement operation of the K0 clutch 24. Further, as shown in FIG. 2(B), in a starting cylinder for the ignition startup, an ignition operation (energization of an ignition coil being switched to an "on" state) for achieving combustion in an expansion stroke is repeatedly executed at predetermined periods. A time point t1 in FIG. 2 denotes a timing at which combustion of the air-fuel mixture is achieved as a result of the ignition operation.

As shown in FIG. 2(C), there are variations in the timing at which the K0 clutch 24 enters a completely engaged state. As shown by a solid line in FIG. 2(C), although a problem does not arise in a case where engagement of the K0 clutch 24 is completed exactly at the ignition time point t1, if engagement of the K0 clutch 24 is completed earlier than the start of combustion due to variations in the clutch operation, there is a possibility that the crankshaft 14a will rotate due to the assist torque of the MG 16 prior to the start of combustion and the piston stopping position will change. If a change arises in the piston stopping position in this manner, due to a change in the stroke volume, a shortage will occur with respect to the fuel injection amount that is determined based on the stroke volume at the piston stopping position at a time that the internal combustion engine 14 stops. Conversely, if engagement of the K0 clutch 24 occurs later than the start of combustion, it will not be possible to secure an appropriate assist torque at the combustion start time point t1. As described above, in a case where variations arise in the clutch operation, there is a concern that it will not be possible to perform ignition startup (that is, misfiring will occur).

Further, if the assist torque (denoted by reference character A0 in the case illustrated in FIG. 2) that the MG 16 that functions as an electric motor when performing ignition startup imparts to the crankshaft 14a is not appropriate, there is a possibility that it will not be possible to reliably perform the ignition startup. An appropriate value of the assist torque can vary due to factors such as the friction at sliding portions of the internal combustion engine 14 being affected by machine differences of the internal combustion engine 14, variations in environmental conditions (cooling water temperature, lubricating oil temperature of the internal combustion engine 14 or the like), and a temporal change in the internal combustion engine 14. If a large assist torque that includes a certain margin is imparted so as to eliminate the influence of such factors so that ignition startup can be reliably realized, the electric power consumption of the MG 16 will increase, and consequently it will be difficult to improve the fuel efficiency of the internal combustion engine by extending a vehicle running range (EV running range) in which the driving force of the MG 16 is utilized. Accordingly, in order to achieve an improvement in the fuel efficiency, it is desirable that the assist torque is reduced as much as possible while contributing to realization of stable ignition startup.

(Determination of Required Assist Torque Utilizing in-Cylinder Pressure Information at Time of Ignition Startup)

FIG. 3 is a time chart for describing characteristic control according to Embodiment 1 of the present invention. More specifically, FIG. 3 illustrates operations in a cylinder in which combustion is first performed at a time of ignition startup.

In the present embodiment, in order to be able to appropriately suppress motor assist torque and realize stable ignition startup while dealing with the influences of a temporal change in the internal combustion engine 14 and the like, a required assist torque Ast_trq of the motor assist at a time of ignition startup is determined based on a local maximum value of the in-cylinder pressure that is detected by the in-cylinder pressure sensor 56 at the time of ignition startup. More specifically, in the example illustrated in FIG. 3, as shown in FIG. 3(G), the required assist torque Ast_trq is determined based on a maximum value Cyl_prss of the in-cylinder pressure during one cycle that is detected by the in-cylinder pressure sensor 56 in a cylinder in which combustion is first performed at the time of ignition startup.

FIG. 3(F) illustrates transitions in a value of a crank counter that counts, for each predetermined crank angle, the amount of change in a crank angle that is detected by the crank angle sensor 54. A count starting time point t3 of the crank counter corresponds to a timing at which the piston (crankshaft 14a) starts to move as a result of a sum of torque that is produced by combustion at the time of starting ignition startup and a pre-assist torque A0_trq overcoming the friction torque. As shown in FIG. 3(G), the in-cylinder pressure at the time of commencing ignition startup begins to rise accompanying the start of combustion (time point t2). After starting to rise, the in-cylinder pressure subsequently decreases due to a decrease in the stroke volume as the piston is pressed downward. Accordingly, the maximum value Cyl_prss of the in-cylinder pressure is obtained in the vicinity of the time point t3 at which the piston starts to move, and it can be said that a torque that is obtained by conversion of the maximum value Cyl_prss (in a case that is accompanied by the pre-assist torque A0_trq as in the example illustrated in FIG. 3, the sum of the aforementioned torque and the pre-assist torque A0_trq) is approximately equal to the friction torque. Accordingly, it can be said that a proportional relation as shown in FIG. 4 that is described next exists between the maximum value Cyl_prss of the in-cylinder pressure in the starting cylinder during ignition startup and the friction torque.

FIG. 4 is a view that represents the relation between the maximum value Cyl_prss of the in-cylinder pressure in the starting cylinder during ignition startup and a friction torque TfrcCPS0 of the internal combustion engine 14. That is, as shown in FIG. 4, the friction torque TfrcCPS0 that is based on the maximum value Cyl_prss of the in-cylinder pressure increases as the maximum value Cyl_prss of the in-cylinder pressure increases. By acquiring the relation between the maximum value Cyl_prss of the in-cylinder pressure and the friction torque TfrcCPS0 as represented in FIG. 4 by experimentation or the like in advance and storing the relation as a map or the like in the ECU 50, the friction torque TfrcCPS0 can be calculated based on a detected value of the maximum value Cyl_prss of the in-cylinder pressure. However, in a case of utilizing the pre-assist torque A0_trq as in the example illustrated in FIG. 3, it is necessary to take the existence of the pre-assist torque A0_trq into account when defining the relation between the maximum value Cyl_prss of the in-cylinder pressure and the friction torque TfrcCPS0.

As described above, it can be said that the friction torque TfrcCPS0 that is calculated based on a detected value of the maximum value Cyl_prss of the in-cylinder pressure is a value of torque that is required for pushing down the piston at the time of ignition startup. Accordingly, it can be said that in order to enable the performance of stable ignition startup, it is sufficient for a torque corresponding to the friction torque TfrcCPS0 to be provided utilizing the assist by the MG 16. Therefore, in the present embodiment, more specifically, a configuration is adopted that determines the required assist torque Ast_trq as shown in the following equation (1) by utilizing the friction torque TfrcCPS0 that is based on the maximum value Cyl_prss of the in-cylinder pressure (however, accompanied by a temperature correction that is described below).

$$Ast\_trq = Tfrc + Tfrc\_corr \quad (1)$$

Where, in the above equation (1), Tfrc_corr represents a temperature-corrected torque value that is described later.

Basically, the friction torque TfrcCPS acquired utilizing the in-cylinder pressure information obtained at the time of the last ignition startup is used as a friction torque Tfrc in the above described equation (1). If such a friction torque TfrcCPS from the time of the last ignition startup does not exist, an initial value Tfrc0 is used. An arbitrary value that is previously set as a value in a reference temperature state (for example, in a predetermined state after warming up of the internal combustion engine 14 is completed (a time at which the cooling water temperature or lubricating oil temperature is 90° C.)) is used as the initial value Tfrc0.

FIG. 5 is a view that illustrates an example of setting the temperature-corrected torque value Tfrc_corr that is used for calculating the required assist torque Ast_trq.

The friction torque of the internal combustion engine 14 changes under the influence of the cooling water temperature or lubricating oil temperature of the internal combustion engine 14. As shown in FIG. 5, the temperature-corrected torque value Tfrc_corr is set so that, while taking a value of the cooling water temperature or lubricating oil temperature in the aforementioned reference temperature state (90° C.) as zero (reference), the temperature-corrected torque value Tfrc_corr increases on a plus side as the cooling water temperature or the like decreases in a case where the cooling water temperature or the like is lower than 90° C. On the other hand, in a case where the cooling water temperature or the like is higher than 90° C., the temperature-corrected torque value Tfrc_corr is set so as to increase on the minus side as the cooling water temperature or the like rises.

In a case where a configuration is adopted so as to store the friction torque TfrcCPS0 that is acquired utilizing the in-cylinder pressure information obtained at the time of ignition startup and to use the stored friction torque Tfrc-CPS0 to calculate the required assist torque Ast_trq for a time of the next and subsequent ignition startup, it is assumed that in some cases there will be a difference between the temperature state at the time that the friction torque TfrcCPS0 is stored and the temperature state at the time of the next and subsequent ignition startup in which the stored friction torque TfrcCPS0 is used for calculation. Therefore, when the ECU 50 calculates and stores the friction torque utilizing the in-cylinder pressure information at a time of ignition startup, the ECU 50 manages the friction torque value as a value that is always with respect to the same temperature state (the aforementioned reference temperature state), as in the case of a friction torque TfrcCPS after temperature correction that is obtained by the following equation (2).

$$TfrcCPS = TfrcCPS0 - Tfrc\_corr \qquad (2)$$

More specifically, when the ECU 50 stores the friction torque, a value of the friction torque Tfrc is stored that is obtained by subtracting the temperature-corrected torque value Tfrc_corr from the friction torque TfrcCPS0 that is acquired based on in-cylinder pressure information utilizing the relation shown in FIG. 4. By this means, the friction torque Tfrc converted to a value in the aforementioned reference temperature state can be stored.

Further, when calculating the required assist torque Ast_trq at a time of performing the next and subsequent ignition startup, the temperature-corrected torque value Tfrc_corr that is determined under the cooling water temperature or lubricating oil temperature at the time of the current ignition startup is added as shown in the above equation (1) to the aforementioned friction torque Tfrc in the reference temperature state that has been stored. By this means, the required assist torque Ast_trq can be calculated based on the corrected friction torque TfrcCPS that is made to correspond to the temperature state at the time of the current ignition startup, without being affected by a change in the temperature state between a time of storing the friction torque and a time of using the friction torque.

(Setting of Pre-Assist Torque)

Further, in the present embodiment, as shown in FIG. 3(D), prior to exerting the required assist torque Ast_trq, the MG 16 is controlled so as to exert a pre-assist torque A0_trq that is lower than the required assist torque Ast_trq. That is, the pre-assist torque A0_trq is set as a predetermined value (a torque value that does not cause the internal combustion engine 14 to rotate) that is less than the static friction torque. Note that, similarly to the required assist torque Ast_trq, the pre-assist torque A0_trq may also be determined as a value that is in accordance with a local maximum value (for example, the maximum value Cyl_prss) of the in-cylinder pressure at a time of ignition startup.

Further, in the example illustrated in FIG. 3(D), a configuration is adopted in which the pre-assist torque A0_trq is imparted at the starting time point t0 of ignition startup. However, as long as imparting of the pre-assist torque A0_trq is performed at a timing prior to the start of imparting of the required assist torque Ast_trq, the timing for imparting the pre-assist torque A0_trq may be after the starting time point t0 of ignition startup. However, it is preferable that the timing for imparting the pre-assist torque A0_trq is set so as to be prior to or at a time point t2 at which combustion is started.

(Timing for Imparting Required Assist Torque)

According to the present embodiment, as shown in FIG. 3(D), the MG 16 is controlled so as to exert the required assist torque Ast_trq at the time point t3 at which a piston (crankshaft 14*a*) starts to move during ignition startup.

(Setting of Ignition Timing Based on Relation with Clutch Engagement Operation)

As shown in FIG. 3(B) and FIG. 3(C), a K0 clutch engagement completion flag X_Ast_OK is a flag that is turned "on" at the time point t1 at which engagement between the crankshaft 14*a* and the output shaft 16*a* of the MG 16 is completed by the K0 clutch 24. In the present embodiment, the ignition timing is controlled so that ignition by the spark plug 22 is started at or after the time point t1 (in the example illustrated in FIG. 3(E), exactly at the time point t1) at which engagement by the K0 clutch 24 is completed.

(Specific Processing According to Embodiment 1)

FIG. 6 is a flowchart illustrating a control routine that the ECU 50 executes to realize characteristic control according to Embodiment 1 of the present invention.

In the routine illustrated in FIG. 6, first, the ECU 50 determines whether or not the internal combustion engine 14 remains stopped (step 100). When, as a result, the ECU 50 determines that the engine remains stopped, the ECU 50 then determines whether or not there is an ignition startup request (step 102). Specifically, the ECU 50 determines whether or not there has been established a condition that requires restarting of the internal combustion engine 14, such as, whether or not a state of charge of a battery that supplies electric power for driving the MG 16 is less than or equal to a predetermined value, whether or not there is a torque request (depression of an accelerator pedal by an amount equal to or greater than a predetermined amount) from the driver, or whether or not an estimated temperature of an exhaust gas purification catalyst that the internal combustion engine 14 includes is less than or equal to a predetermined value.

When it is determined in the aforementioned step 102 that there is an ignition startup request, the ECU 50 drives the respective actuators so that predetermined operations relating to ignition startup begin (step 104). Specifically, as already described with reference to FIG. 3, the fuel injection valve 20 is used to execute fuel injection to a cylinder that remains stopped in the expansion stroke, an engagement operation of the K0 clutch 24 is started using the K0 actuator 26, and imparting of the pre-assist torque A0_trq is started using the MG 16. Specifically, the pre-assist torque A0_trq is a value that is set as already described referring to FIG. 3.

Note that a cylinder that remains stopped in the expansion stroke can be ascertained by acquiring in advance the stopping position of the crankshaft 14a (piston) using the crank angle sensor 54 at a time that the engine remains stopped.

Further, in a case where it is determined in the aforementioned step 102 that there is an ignition startup request, as well as acquiring the cooling water temperature or lubricating oil temperature of the internal combustion engine 14 using the water temperature sensor 58 or the oil temperature sensor 60 (step 106), the ECU 50 also calculates the friction torque Tfrc of the internal combustion engine 14 using the above equation (1) (step 108). With regard to the present step 108, more specifically, the ECU 50 determines whether or not there is a record of updating the friction torque TfrcCPS with respect to the initial value Tfrc0 (step 110). When there is no update record, the initial value Tfrc0 is used as the friction torque Tfrc (step 112). On the other hand, when there is an update record, the most recent friction torque TfrcCPS that is stored in the ECU 50 while taking into account a temperature correction in accordance with the aforementioned equation (2) is used as the friction torque Tfrc (step 114).

Next, the ECU 50 calculates the required assist torque Ast_trq in accordance with the aforementioned equation (1) using the friction torque Tfrc calculated by the processing in the above described steps 108 to 114 along with the temperature-corrected torque value Tfrc_corr (step 116). The ECU 50 stores a map in which the relation between the cooling water temperature or lubricating oil temperature and the temperature-corrected torque value Tfrc_corr is predefined as shown in FIG. 5, and in the present step 116 the ECU 50 refers to the map to calculate the temperature-corrected torque value Tfrc_corr under the cooling water temperature or lubricating oil temperature acquired in the aforementioned step 106.

Next, the ECU 50 determines whether or not the K0 clutch engagement completion flag X_Ast_OK is "on" (step 118). When, as a result, it can be determined that engagement of the K0 clutch 24 is completed because the flag X_Ast_OK is turned "on", the ECU 50 starts an ignition operation with respect to a cylinder that remains stopped in the expansion stroke using the spark plug 22 (step 120).

Subsequently, the ECU 50 determines whether or not input of a crank angle signal is received (whether the crank counter has started counting) using the crank angle sensor 54 (step 122). When the result determined in the present step 122 is affirmative, that is, when it can be determined that combustion succeeded and the piston started to move, in order to reflect the required assist torque Ast_trq in the MG 16 (functioning as a motor), the ECU 50 controls a driving voltage or driving current of the MG 16 (step 124).

Next, the ECU 50 utilizes the in-cylinder pressure sensor 56 to acquire the maximum value Cyl_prss of the in-cylinder pressure (in the starting cylinder of the ignition startup) at the time of input of the crank signal, and also acquires the cooling water temperature or lubricating oil temperature of the internal combustion engine 14 using the water temperature sensor 58 or the oil temperature sensor 60 (step 126). Note that, with respect to which temperature among the cooling water temperature and the lubricating oil temperature is acquired in the present step 126, the temperature that corresponds to the temperature information acquired in the processing in the aforementioned step 106 is acquired here.

Next, the ECU 50 calculates the friction torque TfrcCPS0 based on the maximum value Cyl_prss of the in-cylinder pressure acquired in the above described step 126, in accordance with a map that defines the relation between the maximum value Cyl_prss of the in-cylinder pressure and the friction torque TfrcCPS0 or the like (step 128). Note that, the ECU 50 acquires the in-cylinder pressure at fixed periods using the in-cylinder pressure sensor 56 also during automatic stopping of the internal combustion engine 14.

Thereafter, the ECU 50 calculates and stores the friction torque TfrcCPS that is obtained after the temperature-corrected torque value Tfrc_corr under the cooling water temperature or lubricating oil temperature acquired in the above described step 126 has been reflected in accordance with the above equation (2) in the acquired friction torque TfrcCPS0 (step 130).

According to the control routine illustrated in FIG. 6 that is described above, the required assist torque Ast_trq is determined based on the maximum value Cyl_prss of the in-cylinder pressure that is detected by the in-cylinder pressure sensor 56 at the time of ignition startup. As described in the foregoing, the friction at sliding portions of the internal combustion engine 14 varies as a result of being affected by machine differences of the internal combustion engine 14, variations in environmental conditions (cooling water temperature or lubricating oil temperature of the internal combustion engine 14 or the like), and a temporal change in the internal combustion engine 14 and the like. Further, the maximum value Cyl_prss of the in-cylinder pressure at the time of ignition startup has a correlation with the friction torque (that is, a torque that is necessary to push down a piston and move the crankshaft 14a) of the internal combustion engine 14 at the time of ignition startup. Accordingly, the influence of such changes in the friction is manifested as fluctuations in the maximum value Cyl_prss of the in-cylinder pressure at the time of ignition startup. Therefore, according to the above described technique of the present embodiment, the required assist torque Ast_trq can be calculated in accordance with fluctuations in the maximum value Cyl_prss of the in-cylinder pressure. As a result, stable ignition startup can be realized utilizing the motor assist torque that is always appropriately suppressed, while dealing with the aforementioned influences such as a temporal change in the friction of the internal combustion engine 14. By this means, the electric power consumption at a time of ignition startup by motor assist can be reduced, and an improvement in the fuel efficiency of the internal combustion engine can be favorably realized by expanding a vehicle running range (EV running range) in which the driving force of the MG 16 is utilized.

Furthermore, by adopting a configuration in which the maximum value Cyl_prss of the in-cylinder pressure in a cylinder in which combustion is initially performed at the time of ignition startup (that is, an in-cylinder pressure value at a time that the crankshaft 14a starts to move) is used to determine the required assist torque Ast_trq, the required assist torque Ast_trq can be determined more accurately.

Variations arise in the timing at which motor assist starts. Even though that is the case, if a configuration is adopted in which a motor assist torque that is required for ignition startup is imparted at one time at a timing that matches the start of ignition and combustion of the internal combustion engine, the ignition startup will be affected by the variations in the timing at which motor assist starts. More specifically, similarly to the situation described above with respect to variations in the clutch operation, if the motor assist torque is imparted at a timing that is earlier than the timing at which combustion is started, a deviation will arise in the piston stopping position, while conversely, if the motor assist torque is imparted at a timing that is later than the timing at which combustion is started, it will not be possible to obtain any motor assist at the time of combustion. In this regard, according to the above described routine, a pre-assist torque A0_trq (a lower value than the static friction torque) that is lower than the required assist torque Ast_trq is imparted prior to imparting the required assist torque Ast_trq. By this means, the influence, on ignition startup, of variations in the timing of starting assist by the MG 16 can be reduced while avoiding a situation in which the crankshaft 14a starts to move before imparting of the required assist torque Ast_trq starts.

Further, according to the above described routine, the required assist torque Ast_trq is imparted simultaneously with detection of the start of movement of the piston (crankshaft 14a) during ignition startup. By this means, the motor assist at ignition startup can be efficiently performed. Further, in comparison to a configuration in which an equivalent motor assist torque is imparted from an earlier timing, the electric power consumption can be reduced and an improvement in the fuel efficiency can be achieved.

In addition, according to the aforementioned routine, the ignition timing is controlled so that ignition by the spark plug 22 is started after engagement of the K0 clutch 24 is completed. By this means, the aforementioned influence of variations in the clutch operation is eliminated, and stable ignition startup can be realized.

In the foregoing Embodiment 1, an example is described in which motor assist is always executed in the case of performing ignition startup. However, in a case such as that described hereunder, it is not always necessary to execute motor assist in accompaniment with performance of ignition startup. That is, the aforementioned case, for example, corresponds to a case where a restart request is issued immediately after executing automatic engine stopping (intermittent stopping), or a case where the ignition switch is switched off immediately after executing high-load operation of the internal combustion engine 14 and a restart request is then issued immediately thereafter. In cases such as those that are exemplified here, ignition startup is possible even without motor assist because restarting is performed in a state in which the lubricating oil temperature is high.

Thus, a configuration may be adopted in which a part of the processing in the routine illustrated in the above described FIG. 6 is modified in the following manner, and the ECU 50 is caused to execute such processing. One example of such alternative processing is described hereunder. First, the temperature-corrected torque value Tfrc_corr is previously set so that the required assist torque Ast_trq is calculated as zero in accordance with the above described equation (1) in a case where the cooling water temperature or lubricating oil temperature is high enough that motor assist is not required. Further, the order of the processing of the routine illustrated in FIG. 6 is changed so that processing for determining the required assist torque Ast_trq is performed prior to processing for starting imparting of the pre-assist torque A0_trq in a case where ignition startup is requested. Furthermore, processing to ensure that motor assist that includes imparting of the pre-assist torque A0_trq is not performed in a case where the required assist torque Ast_trq is calculated as zero is added to the processing in the routine illustrated in FIG. 6 that is described above.

Further, in the foregoing Embodiment 1 an example is described in which, as illustrated in FIG. 3(D), ignition startup that is accompanied by motor assist is performed from a state in which the MG torque is zero (that is, a state in which rotation of the MG 16 is stopped). However, the motor assist according to the present invention may be motor assist that is executed in a case of performing ignition startup from a state in which the MG 16 is rotating. States that correspond to a state in which the MG 16 is rotating that is mentioned here include a state in which the MG 16 is rotating in order to generate torque required for EV running and a state in which the MG 16 is rotating in order to generate a torque that is required for producing a creep phenomenon utilizing the torque converter 28 even though the vehicle is temporarily stopped. The following technique can be mentioned as an example of motor assist in a case where ignition startup is performed from a state in which the MG 16 is rotating. That is, a pressing force that causes the clutch plate 24a and the clutch plate 24b to engage can be adjusted by adjusting a hydraulic pressure that is imparted to the K0 clutch 24 by means of the hydraulic K0 actuator 26. By adjusting the pressing force by adjustment of the aforementioned hydraulic pressure, the K0 clutch 24 can be placed in a slip state (semi-engaged state). Therefore, when starting ignition startup, along with starting fuel injection and ignition, a hydraulic pressure for obtaining a slip state is applied to the K0 clutch 24 while increasing the torque of the MG 16. In this slip state, the aforementioned hydraulic pressure and the torque of the MG 16 are adjusted so that a torque of a degree such that the crankshaft 14a does not rotate (that is, a torque that is equivalent to the pre-assist torque A0_trq) is transmitted to the crankshaft 14a from the MG 16 through the K0 clutch 24. Thereafter, at the time point t3 at which the piston (crankshaft 14a) starts to move as a result of the start of combustion, the hydraulic pressure that is imparted to the K0 clutch 24 is raised and the torque of the MG 16 is adjusted so as to enter a completely engaged state to thereby ensure that the required assist torque Ast_trq is transmitted to the crankshaft 14a.

Further, in the above described Embodiment 1 a configuration is adopted that determines the required assist torque Ast_trq based on the maximum value Cyl_prss of the in-cylinder pressure during a single cycle which is detected using the in-cylinder pressure sensor 56 in the cylinder in which combustion is performed first at a time of ignition startup. However, instead of the aforementioned maximum value Cyl_prss, a local maximum value of the in-cylinder pressure that is used when determining the assist torque in the present invention may be the local maximum value of the in-cylinder pressure in a cylinder in which combustion is performed second or thereafter at the time of ignition startup. When utilizing the local maximum value of the in-cylinder pressure during a single cycle which is detected using the in-cylinder pressure sensor 56 in a cylinder in which combustion is performed second or thereafter at the time of ignition startup in this manner, in a case where there are a plurality of local maximum values of the in-cylinder pressure during a period from the compression stroke to the expansion stroke (for example a case where, after the in-cylinder pressure exhibits a first local maximum value in the compression stroke, a second local maximum value (maximum value) arises accompanying combustion in the expansion stroke thereafter), a configuration may be adopted so that either one of those local maximum values can be used.

In the above Embodiment 1, the hybrid vehicle 10 that is equipped with the internal combustion engine 14 and the MG 16 as power sources is described as an example. However, a vehicle that is an object of the present invention is not limited to the hybrid vehicle 10, and may be a vehicle with an idling stop function that utilizes ignition startup to restart an internal combustion engine that remains stopped by the automatic stopping function while the vehicle is temporarily stopped. Further, in the present invention, the term "electric motor that is configured to rotationally drive a crankshaft" is not limited to a component that can be utilized as a power source of a vehicle, such as the MG 16, and for example may be a component provided as a starter motor or as an alternator that can be caused to function as an electric motor of the internal combustion engine. In addition, a vehicle that is an object of the present invention is not limited to a vehicle that includes a clutch for causing engagement between a crankshaft of an internal combustion engine and a rotary shaft of an electric motor as well as for releasing such engagement.

In the above described Embodiment 1, the MG 16 corresponds to "electric motor" according to the above described first and sixth aspects of the present invention. Further, "assist torque determination means" according to the above described first and second aspects of the present invention, "control means" according to the above described first, third and fourth aspects of the present invention, and "ignition timing control means" according to the above described fifth and sixth aspects of the present invention are respectively realized by the ECU 50 executing the series of processing in the routine shown in FIG. 6.

DESCRIPTION OF SYMBOLS

10 hybrid vehicle
12 drive wheel
14 internal combustion engine
14*a* output shaft (crankshaft) of internal combustion engine
16 motor generator (MG)
16*a* output shaft of motor generator
18 throttle valve
20 fuel injection valve
22 spark plug
24 K0 clutch
24*a*, 24*b* clutch plate of K0 clutch
K0 actuator
28 torque converter
30 automatic transmission
30*a* output shaft of automatic transmission
32, 34 actuator
36 propeller shaft
38 differential gear
40 drive shaft
50 electronic control unit (ECU)
52 air flow meter
54 crank angle sensor
56 in-cylinder pressure sensor
58 water temperature sensor
60 oil temperature sensor
62 MG rotational speed sensor

The invention claimed is:

1. A control apparatus for a vehicle including an internal combustion engine which includes a fuel injection valve for directly injecting fuel into a cylinder, a spark plug for igniting an air-fuel mixture, a crank angle sensor for detecting a crank angle, and an in-cylinder pressure sensor for detecting an in-cylinder pressure, and which is configured to perform ignition startup that executes fuel injection and ignition with respect to a cylinder that remains stopped in an expansion stroke and rotationally drives a crankshaft by means of a pressure of combustion that accompanies the fuel injection to thereby start up the internal combustion engine, the control apparatus comprising:

an electric motor that is configured to rotationally drive the crankshaft; and a controller that is programmed to:
determine an assist torque that the electric motor exerts to assist rotation of the crankshaft at a time of ignition startup, based on a local maximum value of an in-cylinder pressure detected by the in-cylinder pressure sensor at the time of ignition startup; and
control the electric motor at the time of ignition startup based on the assist torque that is determined,
wherein, prior to causing the electric motor to exert the assist torque that is determined, the controller controls the electric motor so as to exert a pre-assist torque that is lower than the assist torque.

2. The control apparatus for a vehicle according to claim 1,
wherein the controller determines an assist torque that is used at the time of ignition startup based on a maximum value of an in-cylinder pressure detected by the in-cylinder pressure sensor in a cylinder in which combustion is performed first at the time of ignition startup.

3. The control apparatus for a vehicle according to claim 1,
wherein, when the crankshaft starts to move during the ignition startup, the controller controls the electric motor so as to exert the assist torque that is determined.

4. The control apparatus for a vehicle according to claim 1,
wherein the internal combustion engine is provided as a first power source of the vehicle, and
wherein the electric motor is provided as a second power source of the vehicle,
wherein the control apparatus further comprises
a clutch that switches between a state of engaging the crankshaft and a rotary shaft of the electric motor and a state in which the engagement is released, and
wherein the controller controls an ignition timing so that ignition by the spark plug is started at or after a time point at which engagement of the crankshaft and the rotary shaft of the electric motor by the clutch is completed during the ignition startup.

5. The control apparatus for a vehicle according to claim 1, wherein the controller is programmed to control the electric motor to exert the pre-assist torque prior to rotation of the crankshaft.

6. The control apparatus for a vehicle according to claim 1, wherein the pre-assist torque exerted by the electric motor is insufficient to cause rotation of the crankshaft.

7. A control apparatus for a vehicle including an internal combustion engine which includes a fuel injection valve for directly injecting fuel into a cylinder, a spark plug for igniting an air-fuel mixture, a crank angle sensor for detecting a crank angle, and an in-cylinder pressure sensor for detecting an in-cylinder pressure, and which is configured to perform ignition startup that executes fuel injection and ignition with respect to a cylinder that remains stopped in an expansion stroke and rotationally drives a crankshaft by means of a pressure of combustion that accompanies the fuel injection to thereby start up the internal combustion engine, the control apparatus comprising:

an electric motor that is configured to rotationally drive the crankshaft; and a processor connected to the electric motor, wherein the processor is programmed to:
determine an assist torque that the electric motor exerts to assist rotation of the crankshaft at a time of ignition startup, based on a local maximum value of an in-cylinder pressure detected by the in-cylinder pressure sensor at the time of ignition startup; and
control the electric motor at the time of ignition startup based on the assist torque that is determined,
wherein, prior to causing the electric motor to exert the assist torque that is determined, the controller controls the electric motor so as to exert a pre-assist torque that is lower than the assist torque.

\* \* \* \* \*